US010594819B2

(12) United States Patent
Saito

(10) Patent No.: US 10,594,819 B2
(45) Date of Patent: Mar. 17, 2020

(54) RELAY SERVER AND NON-TRANSITORY STORAGE MEDIUM STORING INSTRUCTIONS EXECUTABLE BY THE RELAY SERVER

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 290 days.

(21) Appl. No.: 14/833,507

(22) Filed: Aug. 24, 2015

(65) Prior Publication Data

US 2016/0065683 A1 Mar. 3, 2016

(30) Foreign Application Priority Data

Aug. 27, 2014 (JP) .................. 2014-172390

(51) Int. Cl.
*H04L 29/08* (2006.01)
*G06F 3/12* (2006.01)
*H04N 1/32* (2006.01)

(52) U.S. Cl.
CPC ........ *H04L 67/2804* (2013.01); *G06F 3/1203* (2013.01); *G06F 3/1267* (2013.01);
(Continued)

(58) Field of Classification Search
CPC . H04L 67/2804; H04L 67/2819; H04L 67/06; H04L 67/2828; H04L 67/2833; H04L 67/2857; H04L 67/2861; G06F 3/12
See application file for complete search history.

(56) References Cited

U.S. PATENT DOCUMENTS 7,953,078 B2   5/2011  Sakai
2002/0021902 A1*  2/2002 Hosoda ................. G03B 17/48
                                                        396/429
(Continued)

FOREIGN PATENT DOCUMENTS

JP     2005-100187 A    4/2005
JP     2012-095281 A    5/2012
(Continued)

OTHER PUBLICATIONS

Office Action issued in related U.S. Appl. No. 15/094,416, dated Nov. 16, 2016.
(Continued)

*Primary Examiner* — Phyllis A Book
*Assistant Examiner* — Anh Nguyen
(74) *Attorney, Agent, or Firm* — Merchant & Gould P.C.

(57) ABSTRACT

A relay server includes: a communication device configured to communicate with a storage server and an image recording apparatus configured to execute a plurality of processes based on one image; and a controller. The controller executes: transmitting a first storing instruction via the communication device in a first transmission process, the first storing instruction being for storing a plurality of image data to be respectively processed in the plurality of processes for the one image, into the storage server; and when a request of transmission of image data corresponding to a particular process of the plurality of processes is received from the image recording apparatus via the communication device, transmitting acquisition information to the image recording apparatus via the communication device in a second transmission process, the acquisition information being for acquisition of the image data corresponding to the particular process from the storage server.

15 Claims, 13 Drawing Sheets

(52) U.S. Cl.
CPC .......... *G06F 3/1271* (2013.01); *G06F 3/1287* (2013.01); *H04L 67/06* (2013.01); *H04L 67/2819* (2013.01); *H04L 67/2828* (2013.01); *H04L 67/2857* (2013.01); *H04N 1/32* (2013.01)

(56) References Cited

U.S. PATENT DOCUMENTS

| | | |
|---|---|---|
| 2009/0150503 A1 | 6/2009 | Theeten et al. |
| 2010/0149091 A1 | 6/2010 | Kota et al. |
| 2010/0185858 A1 | 7/2010 | Nishimi et al. |
| 2011/0149333 A1 | 6/2011 | Hong |
| 2012/0081743 A1 | 4/2012 | Watanabe et al. |
| 2012/0110066 A1* | 5/2012 | Furuta ............... G06F 3/122 709/203 |
| 2012/0120439 A1 | 5/2012 | Minagawa |
| 2012/0307292 A1* | 12/2012 | Urakawa ............ H04L 65/105 358/1.15 |
| 2013/0038899 A1* | 2/2013 | Seikh ................ G06F 3/1204 358/1.15 |
| 2013/0077117 A1 | 3/2013 | Kobayashi |
| 2013/0163017 A1 | 6/2013 | Matsuda |
| 2013/0202222 A1 | 8/2013 | Saito |
| 2013/0326525 A1 | 12/2013 | Sasaki |
| 2014/0009776 A1* | 1/2014 | Suzuki ............... G06K 15/1807 358/1.13 |
| 2014/0098399 A1* | 4/2014 | Iwadate ............. G06K 15/005 358/1.15 |
| 2014/0185087 A1* | 7/2014 | Hayashi ............. G06F 3/122 358/1.15 |
| 2014/0218762 A1* | 8/2014 | Abe ................... G06K 15/1803 358/1.15 |
| 2014/0362402 A1 | 12/2014 | Tsuboi |
| 2015/0180933 A1 | 6/2015 | Spracklen et al. |
| 2015/0268894 A1* | 9/2015 | Saito ................. G06F 3/1204 358/1.16 |
| 2016/0224280 A1 | 8/2016 | Saito |

FOREIGN PATENT DOCUMENTS

| | | |
|---|---|---|
| JP | 2013-20455 A | 1/2013 |
| JP | 2013-129148 A | 7/2013 |
| JP | 2013-131224 A | 7/2013 |
| JP | 2013-161227 A | 8/2013 |
| JP | 2013-178788 A | 9/2013 |
| JP | 2013-251711 A | 12/2013 |
| JP | 2013-254407 A | 12/2013 |

OTHER PUBLICATIONS

U.S. Office Action (Notice of Allowance) issued in related U.S. Appl. No. 14/661,954, dated Aug. 31, 2015.
Office Action (Notice of Allowance) issued in related U.S. Appl. No. 15/094,416, dated Mar. 27, 2017.
Related U.S. Appl. No. 14/661,954, filed Mar. 18, 2015.
Office Action (Notice of Allowance) issued in related U.S. Appl. No. 14/661,954, dated Nov. 25, 2015.
Japanese Office Action for related Japanese Patent Application No. 2014-055967 dated Dec. 19, 2017 (8 pages).
Office Action (Decision of Refusal) issued in related Japanese Patent Application No. 2014-055967, dated Jul. 24, 2018.
Office Action (Notification of Reason for Refusal) issued in related Japanese Patent Application No. 2014-172390, dated Aug. 21, 2018.

* cited by examiner

FIG.4

```
dataSaveRootFolder
├       MachineUniqueId_A
│       ├       thumbnail
│       │       ├       20141226205312_001.jpg
│       ├       postcard
│       │       ├       20141226205312_001.jpg
│
│
├       MachineUniqueId_B
        ├       thumbnail
        │       ├       20141223211416_001.jpg
        │       ├       20141220180952_001.jpg
        ├       postcard
        │       ├       20141223211416_001.jpg
        │       ├       20141220180952_001.jpg
```

RELAY SERVER AND NON-TRANSITORY STORAGE MEDIUM STORING INSTRUCTIONS EXECUTABLE BY THE RELAY SERVER

CROSS REFERENCE TO RELATED APPLICATION

The present application claims priority from Japanese Patent Application No. 2014-172390, which was filed on Aug. 27, 2014, the disclosure of which is herein incorporated by reference in its entirety.

BACKGROUND

Technical Field

The following disclosure relates to a relay server communicable with a printer and a storage server and to a non-transitory storage medium storing a plurality of instructions executable by a processor of the relay server.

Description of the Related Art

There is known a communication system including a terminal device, a storage server, and a relay server. One example of the communication system is configured such that the terminal device can instruct the relay server to upload and download image data to and from the storage server.

SUMMARY

A web server is employed for the storage server in the above-described communication system. Some web servers have a function in which when image data of large size is uploaded, the web server based on the image data of large size automatically creates image data of small size suitable for display. The server stores not only the uploaded image data of large size but also the image data of small size suitable for display. In the communication system including such a server, accordingly, a user can check images based on the image data on, e.g., a display of the terminal device. In contrast, some storage servers have only a data storage function. In the communication system including such a server, the user cannot check images based on the image data on a display, for example. That is, the usability on the terminal device may be deteriorated depending upon the function of the storage server. Accordingly, an object of the disclosure is to improve usability on a terminal device regardless of functions of a storage server.

In one aspect of the disclosure, a relay server includes: a communication device configured to communicate with a storage server and an image recording apparatus configured to execute a plurality of processes based on one image; and a controller. The controller is configured to execute: transmitting a first storing instruction via the communication device in a first transmission process, the first storing instruction being for storing a plurality of image data to be respectively processed in the plurality of processes for the one image, into the storage server; and when a request of transmission of image data corresponding to a particular process of the plurality of processes is received from the image recording apparatus via the communication device, transmitting acquisition information to the image recording apparatus via the communication device in a second transmission process, the acquisition information being for acquisition of the image data corresponding to the particular process from the storage server.

In another aspect of the disclosure, a non-transitory storage medium stores a plurality of instructions executable by a processor of a relay server. The relay server includes a communication device configured to communicate with a storage server and an image recording apparatus configured to execute a plurality of processes based on one image. The plurality of instructions, when executed by the processor, cause the relay server to execute: transmitting a first storing instruction via the communication device in a first transmission process, the first storing instruction being for storing a plurality of image data to be respectively processed in the plurality of processes for the one image, into the storage server; and when a request of transmission of image data corresponding to a particular process of the plurality of processes is received from the image recording apparatus via the communication device, transmitting acquisition information to the image recording apparatus via the communication device in a second transmission process, the acquisition information being for acquisition of the image data corresponding to the particular process from the storage server.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 4 is a view illustrating a data storage structure in a storage server;

DETAILED DESCRIPTION OF THE EMBODIMENTS

Configuration of Communication System

Figure 1:
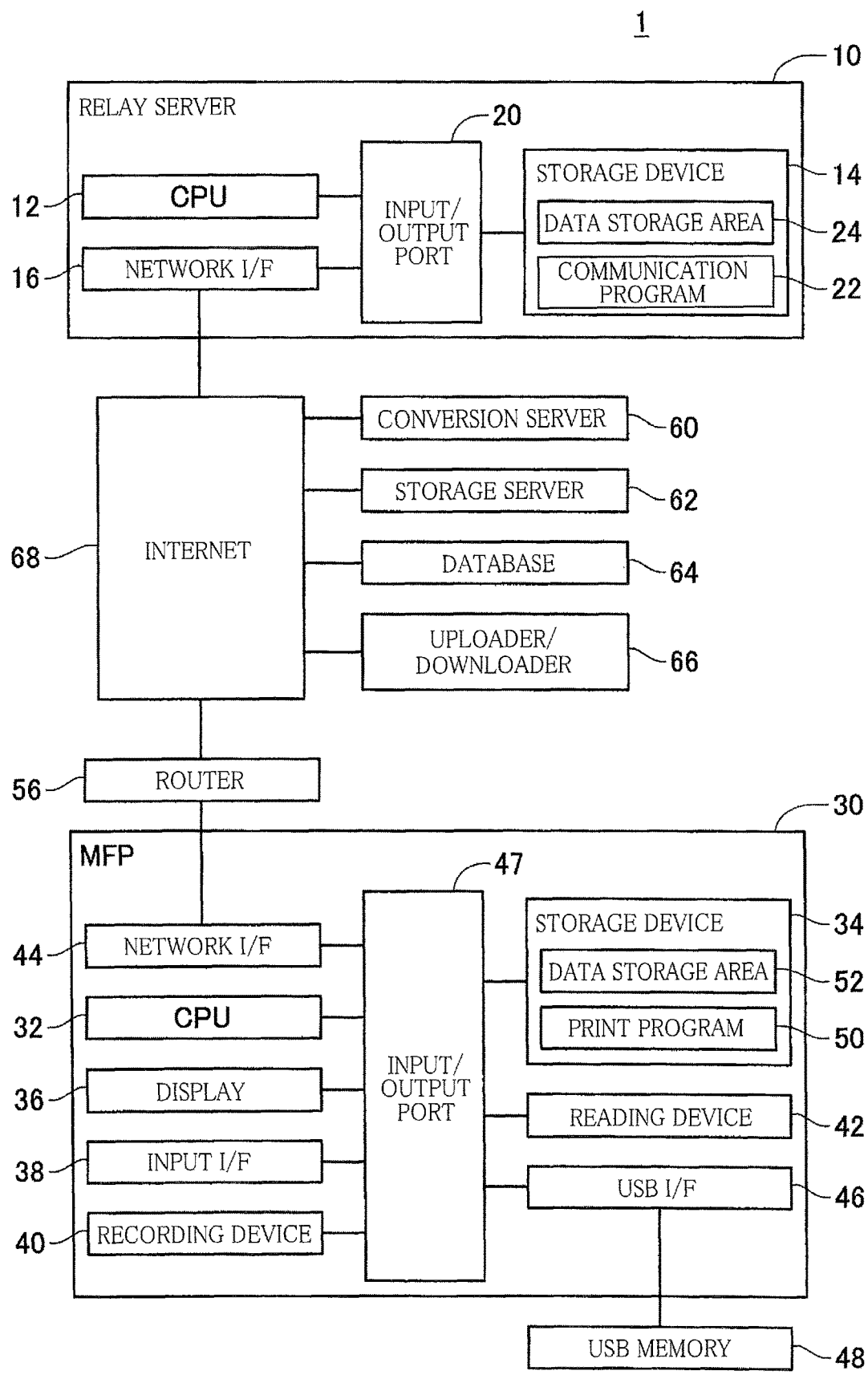
FIG. 1 is a block diagram illustrating a communication system.

Hereinafter, there will be described embodiments by reference to the drawings. FIG. 1 illustrates a communication system 1 according to one embodiment. The communication system 1 includes a relay server 10, a multi-function peripheral (MFP) 30 as one example of a printer, a conversion server 60, a storage server 62, a database 64, and an uploader/downloader 66 as one example of an uploader and a downloader. The relay server 10, the MFP 30, the conversion server 60, the storage server 62, the database 64, and the uploader/downloader 66 can transmit and receive data over the Internet 68. The conversion server 60 converts a certain type of image data to another type in accordance with its usage. The storage server 62 is a server only for storing image data and other information and cannot execute other processings such as creation or conversion of image data like the conversion server 60.

There will be next explained a configuration of the relay server 10. The relay server 10 includes a central processing unit (CPU) 12 as one example of a controller and a computer, a storage device 14, and a network interface 16 as one example of a communication device. These devices can communicate with each other via an input/output port 20.

The network interface 16 communicates with an external device over the Internet 68 and is connected to the MFP 30, the conversion server 60, the storage server 62, the database 64, and the uploader/downloader 66 over the Internet 68. This configuration enables the relay server 10 to transfer various kinds of data with the MFP 30, the conversion server 60, the storage server 62, the database 64, and the uploader/downloader 66.

The CPU 12 executes processings according to a communication program 22 stored in the storage device 14. The communication program 22 causes the CPU 12 to perform data communication with the MFP 30, the conversion server 60, the storage server 62, the database 64, and the uploader/downloader 66. In the following explanation, the CPU 12 which executes a program such as the communication program 22 may be described simply by the name of program. For example, wordings "the communication program 22 executes" may mean wordings "the CPU 12 executing the communication program 22 executes".

The storage device 14 has a data storage area 24. The data storage area 24 stores image data acquired from, e.g., the conversion server 60 and data required for execution of the communication program 22, for example. It is noted that the storage device 14 is constituted by a random access memory (RAM), a read only memory (ROM), a flash memory, a hard disk (HDD), and a buffer of the CPU 12, for example.

There will be next explained a configuration of the MFP 30. The MFP 30 includes a CPU 32, a storage device 34, a display 36, an input interface 38, a recording device 40, a reading device 42, a network interface 44, and a USB interface 46. These devices can communicate with each other via an input/output port 47.

The display 36 has a display surface for displaying various functions of the MFP 30. Examples of the display 36 include an LCD, an organic EL display, and a plasma display. The input interface 38 may be a touchscreen constituted integrally with the display 36, for example, and accepts a user operation for a button displayed on the display 36. As another example, the input interface 38 may be hard keys.

The recording device 40 is a printing mechanism such as an ink jet head. The CPU 32 inputs a drive signal to the recording device 40. In the case where the recording device 40 is an ink-jet head, the ink-jet head ejects ink from nozzles in accordance with the input drive signal. The reading device 42 reads an image to perform scanning Examples of the reading device 42 include a CCD image sensor and a contact image sensor.

The network interface 44 is connected to the Internet 68 via a router 56. The network interface 44 communicates with an external device over the Internet 68 and is connected to the relay server 10, the conversion server 60, the storage server 62, the database 64, and the uploader/downloader 66 over the Internet 68. This configuration enables the MFP 30 to transfer various kinds of data with the relay server 10, the conversion server 60, the storage server 62, the database 64, and the uploader/downloader 66.

The CPU 32 executes processings according to a print program 50 stored in the storage device 34. The print program 50 is for printing using the communication system 1. The storage device 34 has a data storage area 52. The data storage area 52 stores image data to be used in printing, for example. It should be noted that the data storage area 52 is constituted by a RAM and used for temporary storage. A USB memory 48 can be mounted on the USB interface 46. This configuration enables the MFP 30 to store image data or other information in the USB memory 48 for a long time.

Printing by MFP Using Communication System

Figure 2:
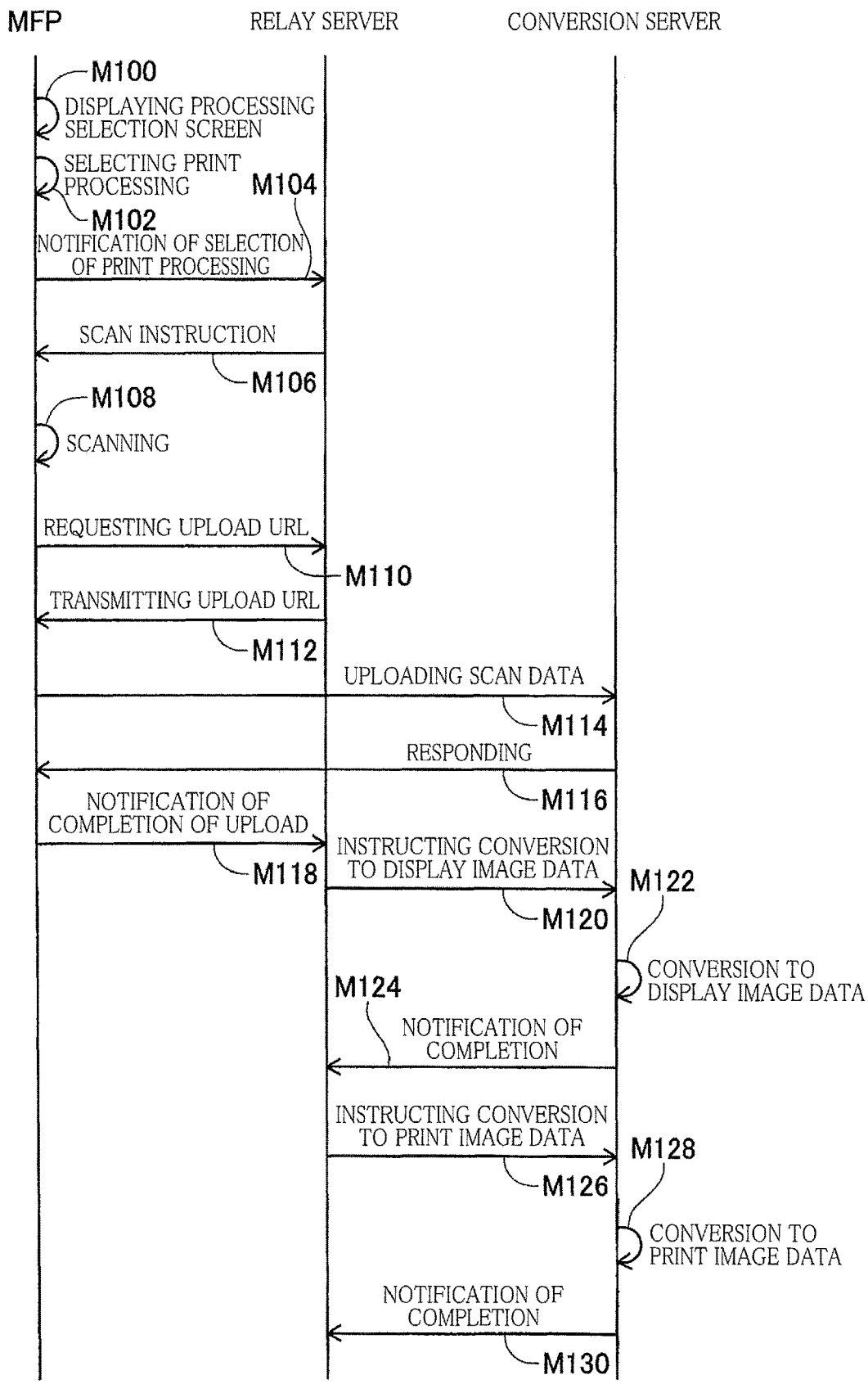
FIG. 2 is a sequence diagram illustrating operations of the communication system.
Figure 3:
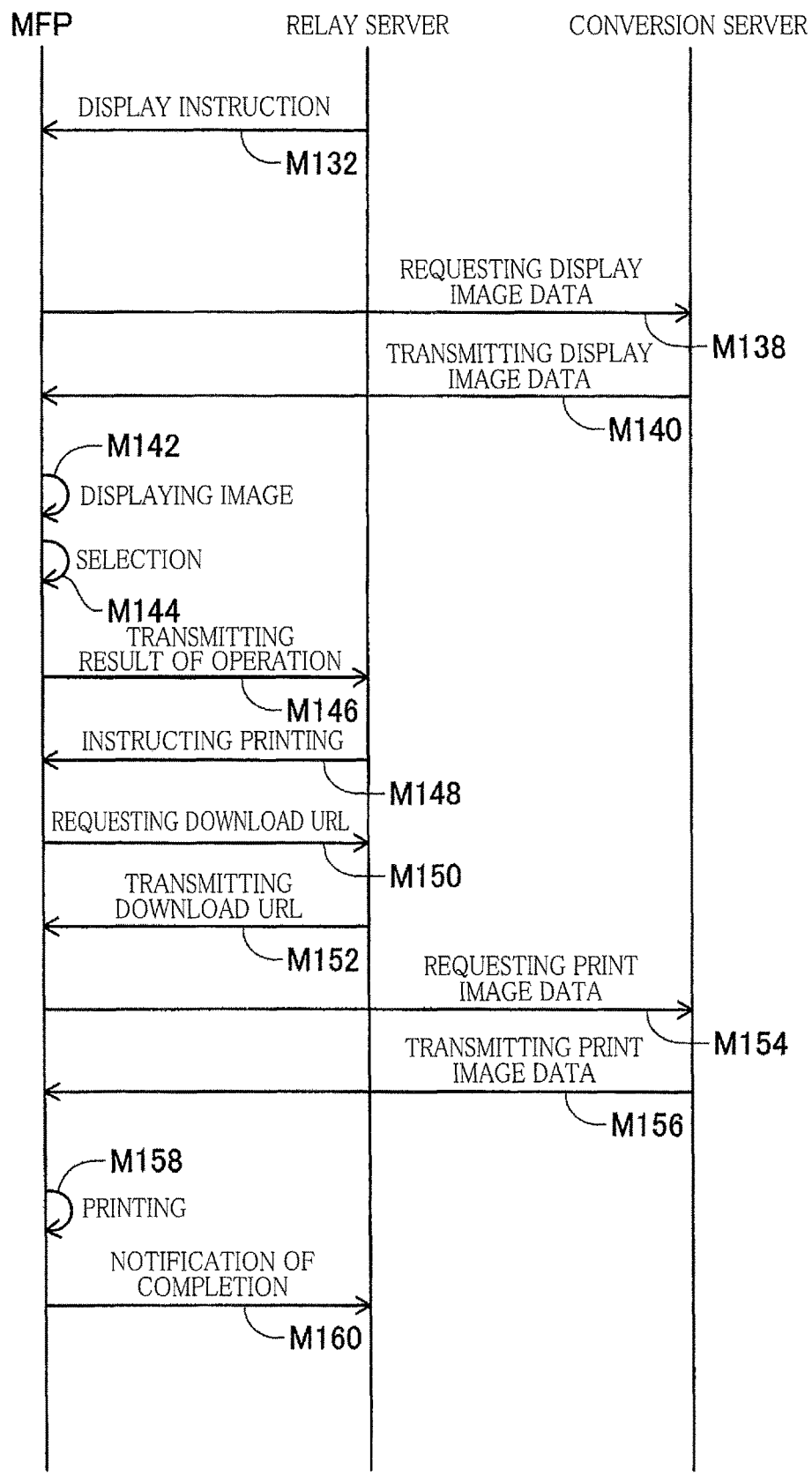
FIG. 3 is a sequence diagram illustrating operations of the communication system.

In the communication system 1, the conversion server 60 converts scan data obtained by scanning of the MFP 30, and the MFP 30 prints an image based on image data obtained in the conversion processing. There will be next explained, with reference to FIGS. 2 and 3, the conversion processing for image data and the print processing in the communication system 1.

In the communication system 1, the display 36 of the MFP 30 at M100 displays a processing selection screen for selection of a processing relating to the printing. The processing selection screen contains: a button for selecting the print processing; a button for uploading image data created in the print processing, to the storage server 62; a button for storing image data created in the print processing, into the USB memory 48; a button for selecting a reprint processing; and a button for deleting image data from the storage server 62.

When the button for selecting the print processing is pressed or operated on the processing selection screen at M102, information indicating that the print processing has been selected is at M104 transmitted from the MFP 30 to the relay server 10. Upon receiving the information, the relay server 10 at M106 transmits a scan instruction to the MFP 30. Upon receiving the scan instruction, the MFP 30 at M108 executes a scan processing. The MFP 30 at M110 requests the relay server 10 to transmit a uniform resource locator (URL) for an upload of the scan data. Upon receiving the request of transmission of the upload URL, the relay server 10 at M112 transmits the upload URL to the MFP 30. It is noted that the upload URL indicates the conversion server 60 as a destination of the transmission.

Upon receiving the upload URL, the MFP 30 at M114 uses the upload URL to upload the scan data created in the scan processing, to the conversion server 60. Upon the upload of the scan data, the conversion server 60 at M116 responds to the MFP 30. The MFP 30 at M118 transmits, to the relay server 10, information indicating completion of the upload. Upon receiving the completion of the upload, the relay server 10 at M120 instructs the conversion server 60 to convert the scan data to image data for displaying (hereinafter may be referred to as "display image data"). Upon receiving the conversion instruction, the conversion server 60 at M122 converts the scan data to the display image data. The conversion server 60 at M124 transmits, to the relay server 10, information indicating completion of the conversion.

The relay server 10 at M126 instructs the conversion server 60 to convert the scan data to image data for printing (hereinafter may be referred to as "print image data". In response to the conversion instruction, the conversion server 60 at M128 converts the scan data to the print image data.

The conversion server 60 at M130 transmits, to the relay server 10, information indicating completion of the conversion. Upon receiving information indicating the completion of the conversion, the relay server 10 at M132 transmits a display instruction to the MFP 30. It is noted that this display instruction contains a URL for downloading the display image data from the conversion server 60.

The MFP 30 at M138 uses the download URL contained in the received display instruction to request the conversion server 60 to transmit the display image data converted by the conversion server 60, to the MFP 30, that is, the MPF 30 transmits a download request to the conversion server 60. In response to the request of the download, the conversion server 60 at M140 transmits the display image data to the MFP 30. The MFP 30 at M142 displays an image on the display 36 based on the display image data. The user at M144 checks the image displayed on the display 36 to operate a button for instructing execution of processings to be executed.

The MFP 30 at M146 transmits a result of the button operation to the relay server 10. The relay server 10 at M148 transmits a print instruction to the MFP 30. Upon receiving the print instruction, the MFP 30 at M150 requests the relay server 10 to transmit a URL for downloading the print image data from the conversion server 60. Upon receiving the request of transmission of the download URL, the relay server 10 at M152 transmits the download URL to the MFP 30. The MFP 30 at M154 uses the download URL to request the conversion server 60 to transmit the print image data converted by the conversion server 60, that is, the MFP 30 transmits a download request to the conversion server 60. In response to the request of the download, the conversion server 60 at M156 transmits the print image data to the MFP 30. Upon receiving the print image data, the MFP 30 at M158 executes the print processing for an image based on the image data. After completion of the print processing, the MFP 30 at M160 transmits, to the relay server 10, information indicating the completion of the print processing.

Storage of Converted Image Data in Storage Server

In the communication system 1, as described above, the scan data obtained by scanning of the MFP 30 is converted to the display image data and the print image data by the conversion server 60. The MFP 30 then executes (i) the display processing for the image based on the converted display image data and (ii) the print processing based on the converted print image data. However, the data storage area 52 of the MFP 30 can only temporarily store the data as described above. Thus, in the case where the USB memory 48 is not connected to the USB interface 46, the display image data and the print image data cannot be stored for reuse. That is, in the case where the user later wants to use the image data converted by the conversion server 60, for example, he or she has to bring the USB memory, resulting in poor usability. To address this problem, the communication system 1 is configured such that the image data converted by the conversion server 60 is uploaded to the storage server 62 and stored into the storage server 62. The print image data is larger than the display image data in the number of pixels and suitable for printing. The display image data is smaller than the print image data in the number of pixels and suitable for display on the MFP 10.

Figure 5:
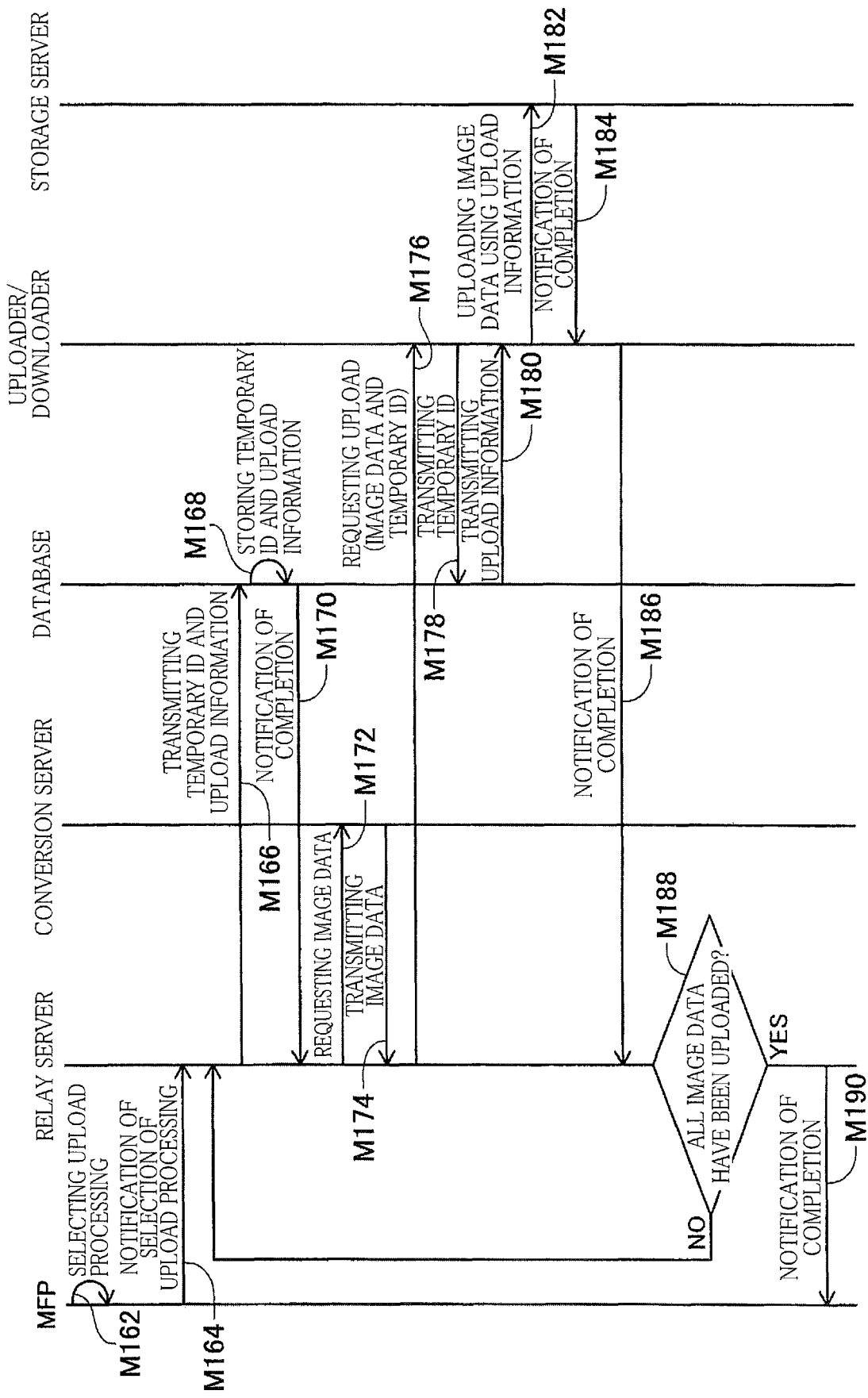
FIG. 5 is a sequence diagram illustrating operations of the communication system.

It is noted that folders respectively corresponding to a plurality of the MFPs 30 are created in the storage server 62, and each of the folders stores image data created by a corresponding one of the MFPs 30. In the example illustrated in FIG. 4, specifically, image data used by the MFP 30 in the display processing and the print processing are stored in a folder "MachineUniqueId_A", and image data used by another MFP in the display processing and the print processing are stored in a folder "MachineUniqueId_B". In the present embodiment, a unique ID assigned to the MFP 30 is used as a folder name corresponding to each MFP 30. Examples of the unique ID include a MAC address and a node name. Also, the folder name may not contain the unique ID assigned to the MFP 30, and the data storage area 24 may store information about a relationship between each folder name and the unique ID assigned to the MFP 30 corresponding to the folder. Each of the folders corresponding the respective MFPs contains a folder or folders "thumbnail" for storing the display image data and a folder or folders "postcard" for storing the print image data. Each of the folder "thumbnail" and the folder "postcard" stores image data attached with a file name. There will be next explained, with reference to FIG. 5, an upload processing for uploading the image data to the storage server 62 in the communication system 1.

The processing selection screen contains a button for uploading the image data created in the print processing to the storage server 62. When the button is operated at M162, information indicating that the upload processing has been selected is at M164 transmitted from the MFP 30 to the relay server 10. Upon receiving the information, the relay server 10 at M166 transmits the temporary ID and the upload information to the database 64 and instructs the database 64 to store them in association with each other.

Figure 6:
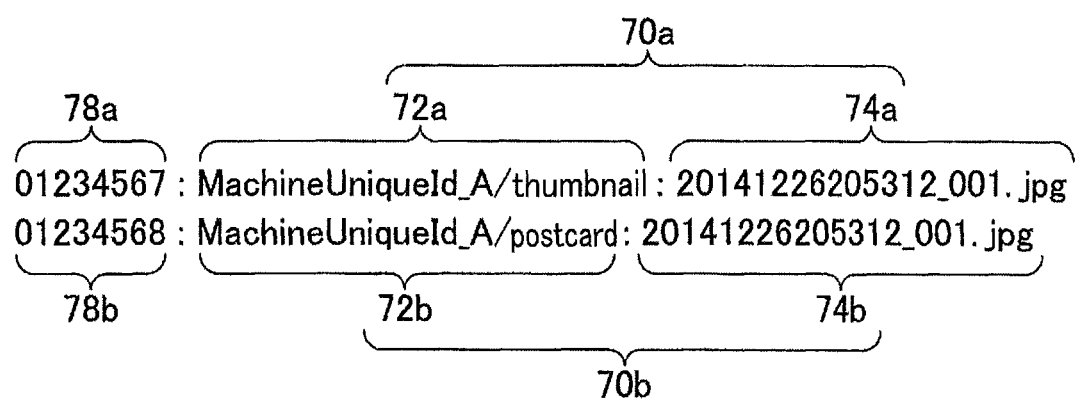
FIG. 6 is a view illustrating upload information and temporary IDs stored in a database.
Figure 7:
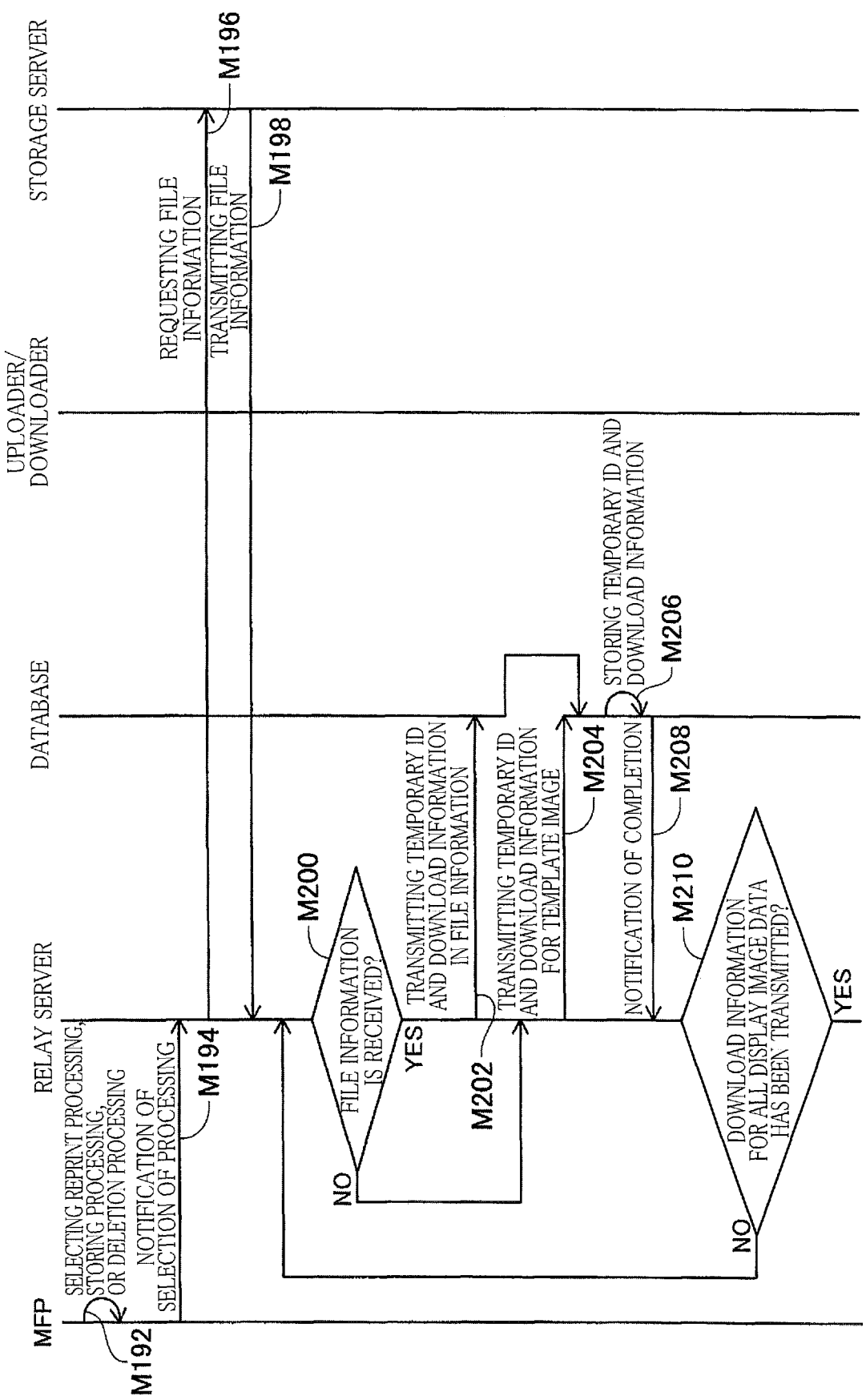
FIG. 7 is a sequence diagram illustrating operations of the communication system.
Figure 8:
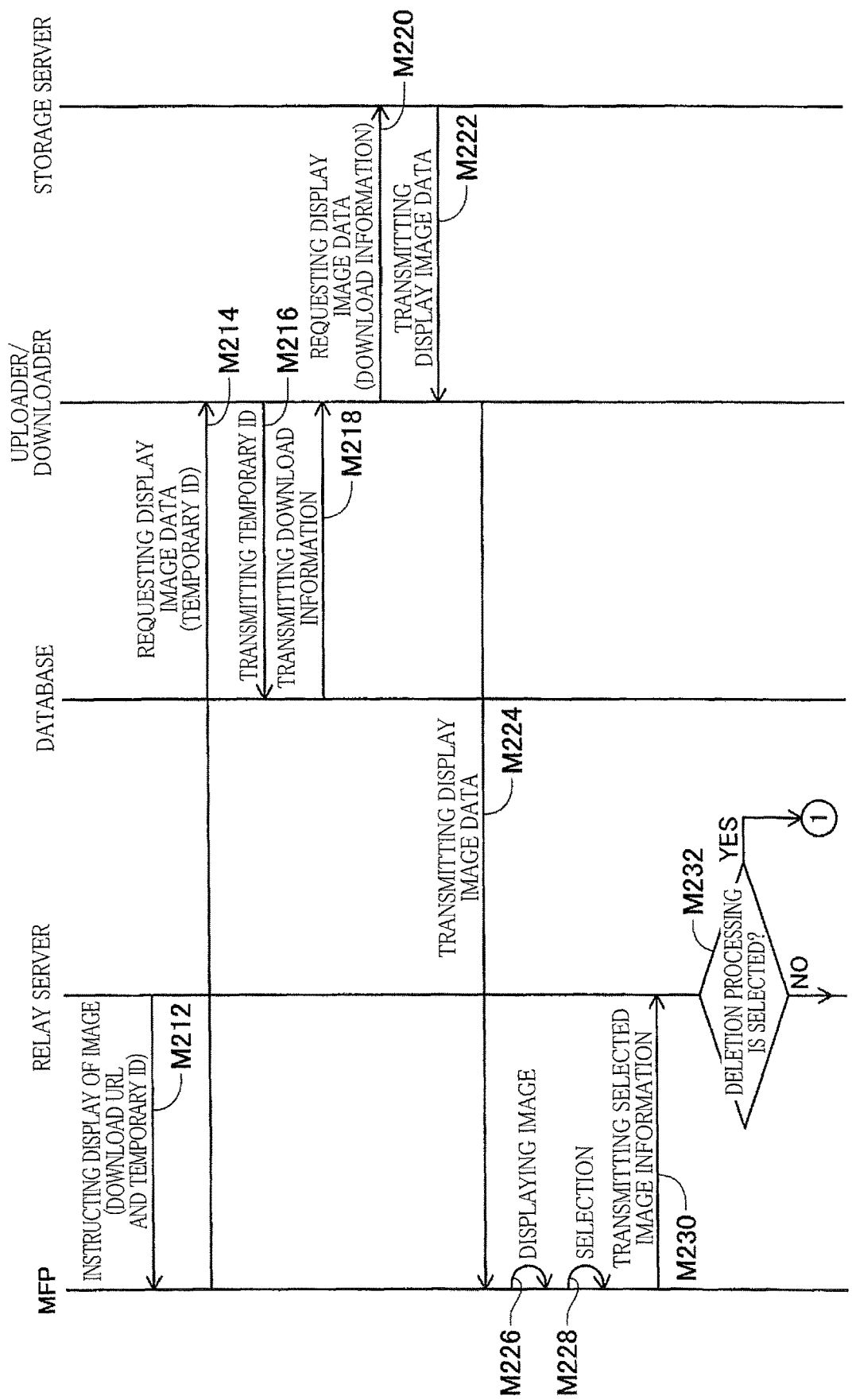
FIG. 8 is a sequence diagram illustrating operations of the communication system.
Figure 9:
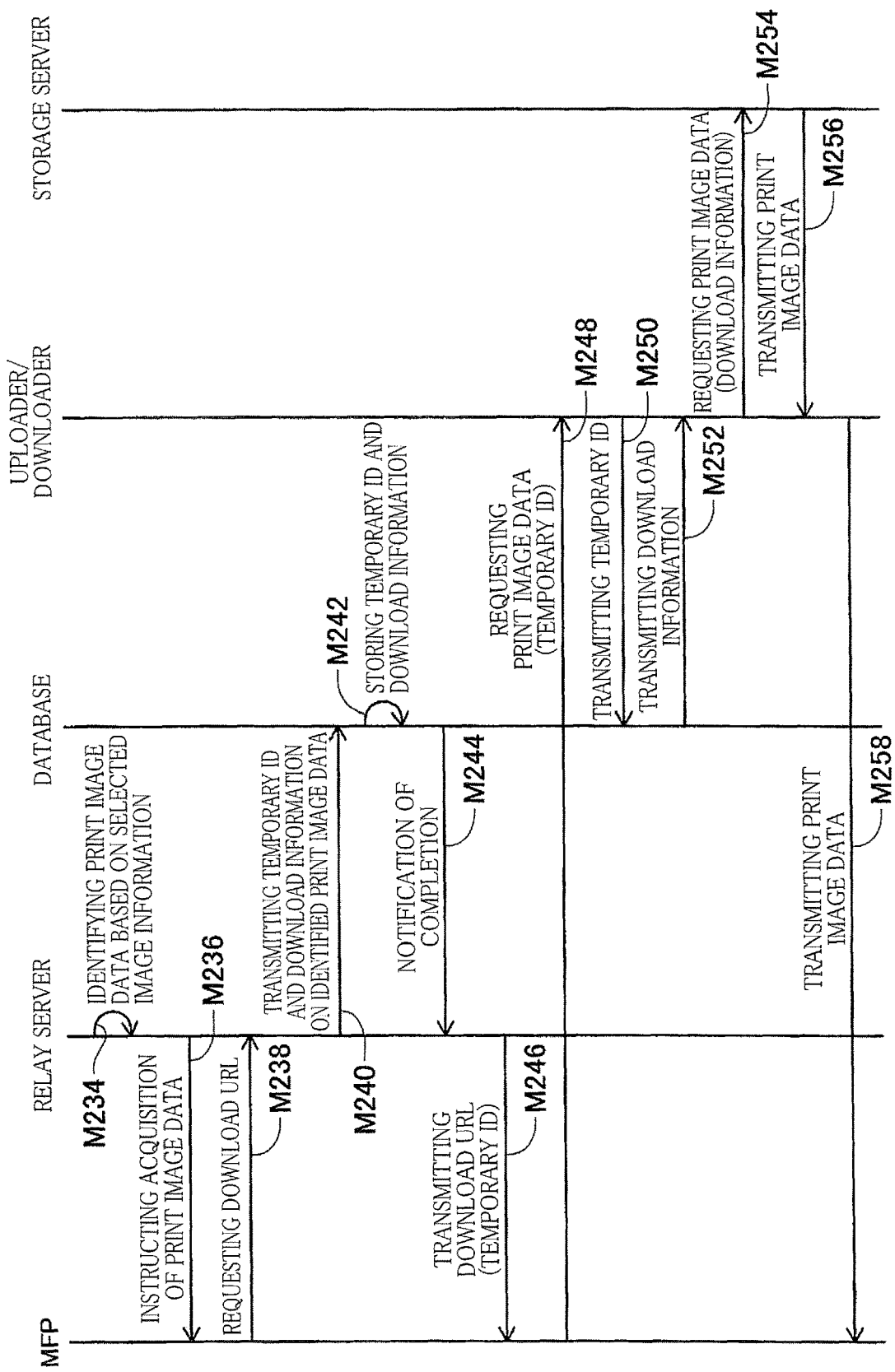
FIG. 9 is a sequence diagram illustrating operations of the communication system.
Figure 10:
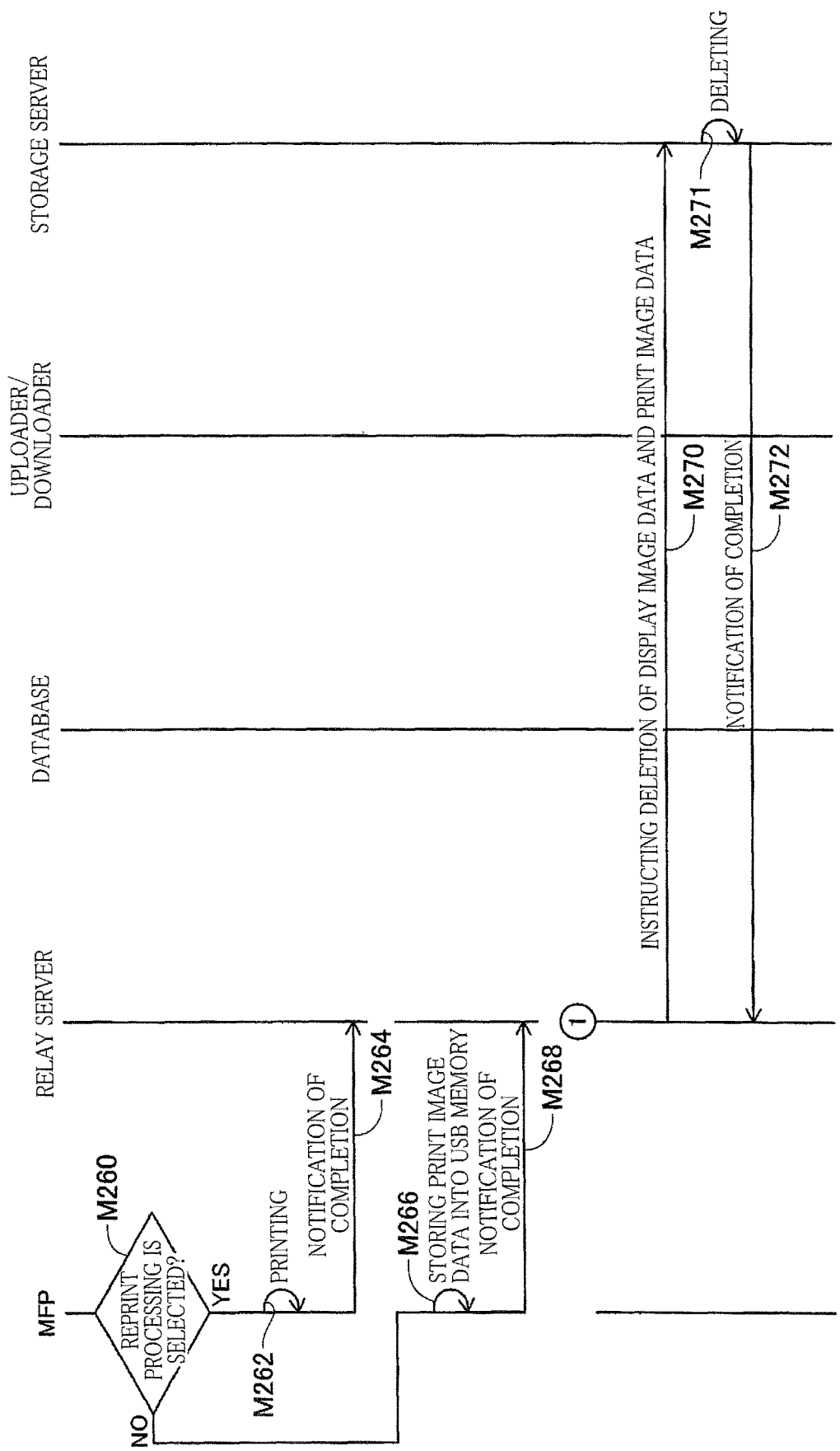
FIG. 10 is a sequence diagram illustrating operations of the communication system.

The upload information is constituted by a folder name and a file name which are used when the image data is stored in the storage server 62. FIG. 6 illustrates upload information 70a on the display image data used by the MFP 30 and upload information 70b on the print image data used by the MFP 30. The upload information 70a is constituted by information 72a, 74a, and the upload information 70b is constituted by information 72b, 74b. Each of the information 72a and the information 72b corresponds to a folder name and each of the information 74a and the information 74b corresponds to a file name. The upload information 70a is used to upload the image data to the folder designated by the information 72a under the file name indicated by the information 74a. Likewise, the upload information 70b is used to upload the image data to the folder designated by the information 72b under the file name indicated by the information 74b.

In the print processing, as described above, the conversion server 60 creates, based on scan data indicating one image, two types of image data, i.e., the display image data and the print image data. As illustrated in FIG. 6, the information 74a and the information 74b corresponding to the file name are identical to each other in the upload information 70a and the upload information 70b respectively corresponding to the two types of image data. Thus, in the case where the upload information 70a and the upload information 70b are used to store the display image data and the print image data into the storage server 62, as illustrated in FIG. 4, the file name of the display image data stored in the folder "thumbnail" is identical to the file name of the print image data stored in the folder "postcard". With this structure, the display image data and the print image data created based on the scan data indicating the one image are stored in the storage server 62 in association with each other.

The temporary ID is a unique ID to be used temporarily and created for each upload information in the relay server 10 on a random fashion. In the example illustrated in FIG. 6, a temporary ID "01234567" (a temporary ID 78a) is created corresponding to upload information 70a, and a temporary ID "01234568" (a temporary ID 78b) is created corresponding to upload information 70b. A set of each of the temporary IDs 78a, 78b and a corresponding one of the upload information 70a and the upload information 70b are transmitted to the database 64. It is noted that the temporary ID and the upload information corresponding to one image data is transmitted at M166 to the database 64. That is, the relay server 10 at M166 transmits the set of the temporary ID and the upload information corresponding to the one image, to the database 64.

Upon receiving the set of the temporary ID and the upload information, the database 64 at M168 stores the temporary ID and the upload information in association with each other. The database 64 at M170 notifies the relay server 10 of completion of storing. The relay server 10 at M172 requests the conversion server 60 to transmit the image data converted by the conversion server 60 to the relay server 10. In this processing, the relay server 10 requests the image data corresponding to the upload information transmitted in M166. That is, in the case where the upload information transmitted at M166 corresponds to the display image data, that is, in the case where the information 72a, 72b corresponding to the folder names in the upload information 70a, 70b contain the characters "thumbnail", the relay server 10 requests the display image data. On the other hand, in the case where the information 72a, 72b corresponding to the folder names in the upload information 70a, 70b contain the characters "postcard", the relay server 10 requests the print image data.

Upon receiving the request of the transmission, the conversion server 60 at M174 sequentially transmits the image data to the relay server 10. The relay server 10 at M176 requests the uploader/downloader 66 to upload the received image data. In this processing, the relay server 10 transmits the received image data and the temporary ID transmitted at M166, to the uploader/downloader 66. Upon receiving the upload request, the uploader/downloader 66 at M178 transmits the received temporary ID to the database 64. Upon receiving the temporary ID, the database 64 at M180 extracts the upload information stored in association with the temporary ID and transmits the upload information to the uploader/downloader 66.

Upon receiving the upload information, the uploader/downloader 66 at M182 uses the upload information to upload the image data to the storage server 62. That is, the uploader/downloader 66 uploads the image data, under the file name indicated by the information 74a, to the folder designated by the information 72a of the upload information 70a and uploads the image data, under the file name indicated by the information 74b, to the folder designated by the information 72b of the upload information 70b. The storage server 62 at M184 notifies the uploader/downloader 66 of completion of the upload. Upon receiving the completion notification, the uploader/downloader 66 at M186 notifies the relay server 10 of completion of the upload. The relay server 10 at M188 determines whether all the image data converted by the conversion server 60 have been uploaded to the storage server 62 or not. When all the image data have not been uploaded to the storage server 62 (M188: NO), this flow returns to M166. When all the image data have been uploaded to the storage server 62 (M188: YES), the relay server 10 at M190 notifies the MFP 30 of completion of the upload. As a result, all the image data converted by the conversion server 60 are stored in the storage server 62.

Use of Image Data stored in Storage Server

In the communication system 1, as described above, the display image data and the print image data obtained by conversion of the conversion server 60 are stored in the storage server 62. This MFP 30 can perform reprinting based on the image data which is transmitted from the storage server 62 in response to a request of the reprinting from the MFP 30. Also, the MFP 30 can store, into the USB memory 48, the image data which is transmitted from the storage server 62 in response to a request issued by the MFP 30 for storing the image data into the USB memory 48. Also, the image data stored in the storage server 62 can be deleted in response to a request issued by the MFP 30 for deleting the image data. There will be next explained the reprint processing, the storing processing, and the deletion processing in the communication system 1 with reference to FIGS. 7-10.

The processing selection screen contains: a button for selecting the reprint processing; a button for storing the image data created in the print processing into the USB memory 48; and a button for deleting the image data stored in the storage server 62. When any of these buttons is operated at M192, information relating to the operated button is at M194 transmitted from the MFP 30 to the relay server 10. Upon receiving the information, the relay server 10 at M196 requests the storage server 62 to transmit file information corresponding to the MFP having transmitted the information relating to the operated button. That is, the relay server 10 sends the storage server 62 a request of transmission of the file information corresponding to the MFP 30.

Upon receiving the request of transmission of the file information, the storage server 62 at M198 transmits information on the folder name and the file name corresponding to the MFP identified by the unique ID contained in the file request, to the relay server 10 as the file information. That is, information stored in the folder "MachineUniqueId_A" in FIG. 4 is transmitted as the file information to the relay server 10. It is noted that in the case where the storage server 62 stores no file in the folder corresponding to the MFP identified by the unique ID, that is, in the case where the image data corresponding to the MFP identified by the unique ID is not uploaded to the storage server 62, information indicating the absence of the file information is transmitted to the relay server 10. The relay server 10 at M200 determines whether the file information is transmitted from the storage server 62 to the relay server 10 or not.

When the file information is transmitted from the storage server 62 (M200: YES), the relay server 10 at M202 extracts download information from the file information and transmits, to the database 64, a set of the download information (as one example of first identification information) and a temporary ID (as one example of second identification information and acquisition information). Similar to the upload information, the download information is constituted by (i) information corresponding to a folder name contained in the file information and (ii) information corresponding to a file name of a file in a folder having the folder name. It should be noted that only the download information on the display image data is extracted from the file information at M202. That is, information similar to the upload information 70a in FIG. 6 is extracted from the file information as the download information. The temporary ID is an ID to be used temporarily and created for each download information on a random fashion. The set of the temporary ID and the download information corresponding to the temporary ID are at M202 transmitted to the database 64.

When the file information is not transmitted from the storage server 62 at M198 (M200: NO), that is, when the information indicating the absence of the file information is transmitted from the storage server 62, the relay server 10 at M204 transmits a set of a temporary ID and download information corresponding to a sample of the display image data, to the database 64. The storage server 62 stores the sample of the display image data, and the relay server 10 stores a name of a folder storing the sample, and a file name of the sample. Thus, the relay server 10 at M204 creates download information based on the name of the folder storing the sample and the file name of the sample and transmits the set of the download information and the temporary ID to the database 64.

Upon receiving the set of the temporary ID and the download information, the database 64 at M206 stores the temporary ID and the download information in association with each other. The database 64 at M208 notifies the relay server 10 of completion of storing. The relay server 10 at M210 determines whether download information corresponding to all the display image data in the acquired file information has been transmitted to the database 64 or not. When the download information corresponding to all the display image data is not transmitted to the database 64 (M210: NO), this flow returns to M200. When the download information corresponding to all the display image data is transmitted to the database 64 (M210: YES), the relay server 10 at M212 transmits an instruction for displaying the images to the MFP 30. In this processing, the display instruction contains (i) each of all the temporary IDs transmitted to the database 64 as a query and (ii) a URL indicating the uploader/downloader 66 as a destination.

Upon receiving the display instruction, the MFP 30 at M214 uses the URL contained in the display instruction to request the uploader/downloader 66 to transmit the display image data, that is, the MFP 30 transmits a download request to the uploader/downloader 66. In this processing, the MFP 30 transmits, to the uploader/downloader 66, the temporary IDs contained in all the requests received from the relay server 10. Upon receiving the download request, the uploader/downloader 66 at M216 transmits the received temporary IDs to the database 64. Upon receiving the temporary IDs, the database 64 at M218 extracts the download information stored in association with the temporary IDs and transmits the download information to the uploader/downloader 66.

Upon receiving the download information, the uploader/downloader 66 at M220 requests the storage server 62 to transmit the display image data based on the download information, that is, the uploader/downloader 66 transmits a download request to the storage server 62. The storage server 62 at M222 uses the download information to extract the display image data and transmits it to the uploader/downloader 66. That is, the storage server 62 identifies a folder based on information corresponding to the folder name contained in the download information and extracts from the folder the display image data having the file name based on information corresponding to the file name. The storage server 62 transmits the extracted display image data to the uploader/downloader 66. The uploader/downloader 66 at M224 transmits the received display image data to the MFP 30 with information for identifying the display image data. One example of the information for identifying the display image data is a file name.

Upon receiving the display image data, the MFP 30 at M226 displays thumbnail images on the display 36 based on the display image data. The user at M228 selects one of the thumbnail images displayed on the display 36 of the MFP 30. When one of the thumbnail images is selected on the MFP 30, the MFP 30 at M230 transmits, to the relay server 10, information for identifying the display image data corresponding to the selected thumbnail image. The relay server 10 at M232 determines, based on the information transmitted at M194, whether the button for deleting the image data has been operated on the processing selection screen or not. That is, the relay server 10 determines whether the processing selected on the MFP 30 at M228 is the deletion processing for the image data or not.

When the processing selected on the MFP 30 is not the deletion processing for the image data (M232: NO), the relay server 10 at M234 identifies print image data corresponding to the display image data, based on the information for identifying the display image data corresponding to the selected thumbnail image. Specifically, the same information is used for the file names of the display image data and the print image data in the download information corresponding to the display image data and the print image data created from the scan data indicating one image. Thus, the relay server 10 identifies the print image data corresponding to the selected thumbnail image by identifying the download information on the print image data containing the information corresponding to the file name of the display image data indicating the selected thumbnail image.

When the print image data corresponding to the selected thumbnail image is identified, the relay server 10 at M236 instructs the MFP 30 to acquire the identified print image data. Upon receiving the print instruction, the MFP 30 at M238 requests the relay server 10 to transmit a URL for downloading the print image data, to the MFP 30. Upon receiving the request of transmission of the download URL, the relay server 10 at M240 transmits the set of the temporary ID and the download information on the print image data identified at M234, to the database 64.

Upon receiving the set of the temporary ID and the download information, the database 64 at M242 stores the temporary ID and the download information in association with each other. The database 64 at M244 notifies the relay server 10 of completion of storing. The relay server 10 at M246 transmits the URL for downloading the print image data, to the MFP 30. This URL contains the temporary ID transmitted at M242 as a query and indicates the uploader/downloader 66 as a destination.

Upon receiving the download URL, the MFP 30 at M248 requests the uploader/downloader 66 to transmit the print image data to the MFP 30, that is, the MFP 30 transmits a download request to the uploader/downloader 66. In this processing, the MFP 30 transmits the temporary ID to the uploader/downloader 66. Upon receiving the download request, the uploader/downloader 66 at M250 transmits the temporary ID contained in the request, to the database 64. Upon receiving the temporary ID, the database 64 at M252 extracts the download information stored in association with the temporary ID and transmits the download information to the uploader/downloader 66.

Upon receiving the download information, the uploader/downloader 66 at M254 requests the storage server 62 to transmit the print image data to the uploader/downloader 66 using the download information, that is, the uploader/downloader 66 transmits the download request to the storage server 62. The storage server 62 at M256 extracts the print image data identified by the download information and transmits the print image data to the uploader/downloader 66. Upon receiving the print image data, the uploader/downloader 66 at M258 transmits the print image data to the MFP 30.

Upon receiving the print image data, the MFP 30 at M260 determines whether the button for executing the reprint processing is operated on the processing selection screen or not. That is, the MFP 30 determines whether the processing selected on the MFP 30 is the reprint processing or not. When the processing selected on the MFP 30 is the reprint processing (M260: YES), the MFP 30 at M262 executes the reprint processing based on the received print image data. After completion of the reprint processing, the MFP 30 at M264 transmits information indicating the completion of the reprint processing, to the relay server 10.

When the processing selected on the MFP 30 is the storing processing for storing the image data into the USB memory 48 at M260 (M260: NO), the MFP 30 at M266 stores the received print image data into the USB memory 48. After storing the print image data into the USB memory 48, the MFP 30 at M268 transmits information indicating completion of the storing processing, to the relay server 10, and the storing processing for storing the image data into the USB memory 48 ends.

When the processing selected on the MFP 30 is the deletion processing for deleting the image data (M232: YES), the relay server 10 at M270 instructs the storage server 62 to delete (i) the display image data indicating the selected thumbnail image and (ii) the print image data associated with the display image data. It is noted that the deleting instruction contains information for identifying the display image data corresponding to the selected thumbnail image. Upon receiving the deleting instruction, the storage server 62 at M271 deletes the display image data and the print image data which are instructed to be deleted. After the deletion of the display image data and the print image data, the MFP 30 at M272 transmits information indicating completion of the deletion processing, to the relay server 10, and the deletion processing for deleting the display image data and the print image data created based on the scan data indicating the one image is finished.

In the communication system 1 as described above, the display image data and the print image data created by the conversion server 60 are uploaded to the storage server 62. Any of the display image data and the print image data can be downloaded from the storage server 62 as desired. There currently exists a storage server on the Internet which can not only store image data and other similar information but also execute a predetermined processing for the image data. One specific example of such a storage server is a data creation and storage server configured to, when print image data is uploaded, create display image data based on the print image data and store the created display image data and the uploaded print image data. Another specific example is a storage-specific server only capable of storing image data and other similar information but not capable of, e.g., creating image data unlike the storage server 62. In the present communication system 1, since the display image data and the print image data created by the conversion server 60 are uploaded to the storage server 62, and any of the display image data and the print image data can be downloaded from the storage server 62 as desired, any of the data creation and storage server and the storage-specific server can be employed, resulting in higher usability.

In the communication system 1, the upload information for uploading the image data to the storage server 62 and the download information for downloading the image data from the storage server 62 are stored in the database 64 in association with the temporary ID, and the temporary ID is transmitted from the relay server 10 to the uploader/downloader 66, for example. The uploader/downloader 66 uses the temporary ID to acquire the upload information or the download information from the database 64 and uses the upload information or the download information to upload the image data to the storage server 62 or download the image data from the storage server 62. That is, the temporary ID needs to be converted to the upload information or the download information via the database 64 in the upload or download of the image data. With this configuration, even in the event of leakage of the temporary ID, for example, the image data cannot be uploaded to or downloaded from the storage server 62, thereby improving security of the communication system 1.

In the communication system 1, the display image data and the print image data are stored in the storage server 62 in association with each other. When the relay server 10 requests the storage server 62 to delete particular display image data, the storage server 62 deletes not only the particular display image data but also print image data associated with the particular display image data. That is, the storage server 62 deletes the display image data and the print image data created based on scan data indicating one image. This configuration allows the storage server 62 to easily delete all the image data relating to one image, resulting in higher convenience.

It is noted that the processing at M118 is one example of a conversion-request acquisition process. The processing M120 is one example of a sixth transmission process. The processing M136 is one example of a seventh transmission process. The processing M166 is one example of a fourth transmission process. The processing M176 is one example of a first transmission process. The processing M198 is one example of a reception process. The processing M200 is one example of a determination process. The processing M206 is one example of a fifth transmission process. The processings M212 and M246 are one example of a second transmission process. The processing M270 is one example of a third transmission process.

Second Embodiment

There will be next explained the communication system 1 according to a second embodiment. The communication system 1 according to the second embodiment is different from the communication system 1 according to the first embodiment in that the communication system 1 according to the second embodiment does not include the database 64 and the uploader/downloader 66. It is noted that the same reference numerals as used in the first embodiment are used to designate the corresponding elements of the second embodiment, and an explanation of which is dispensed with.

Figure 11:
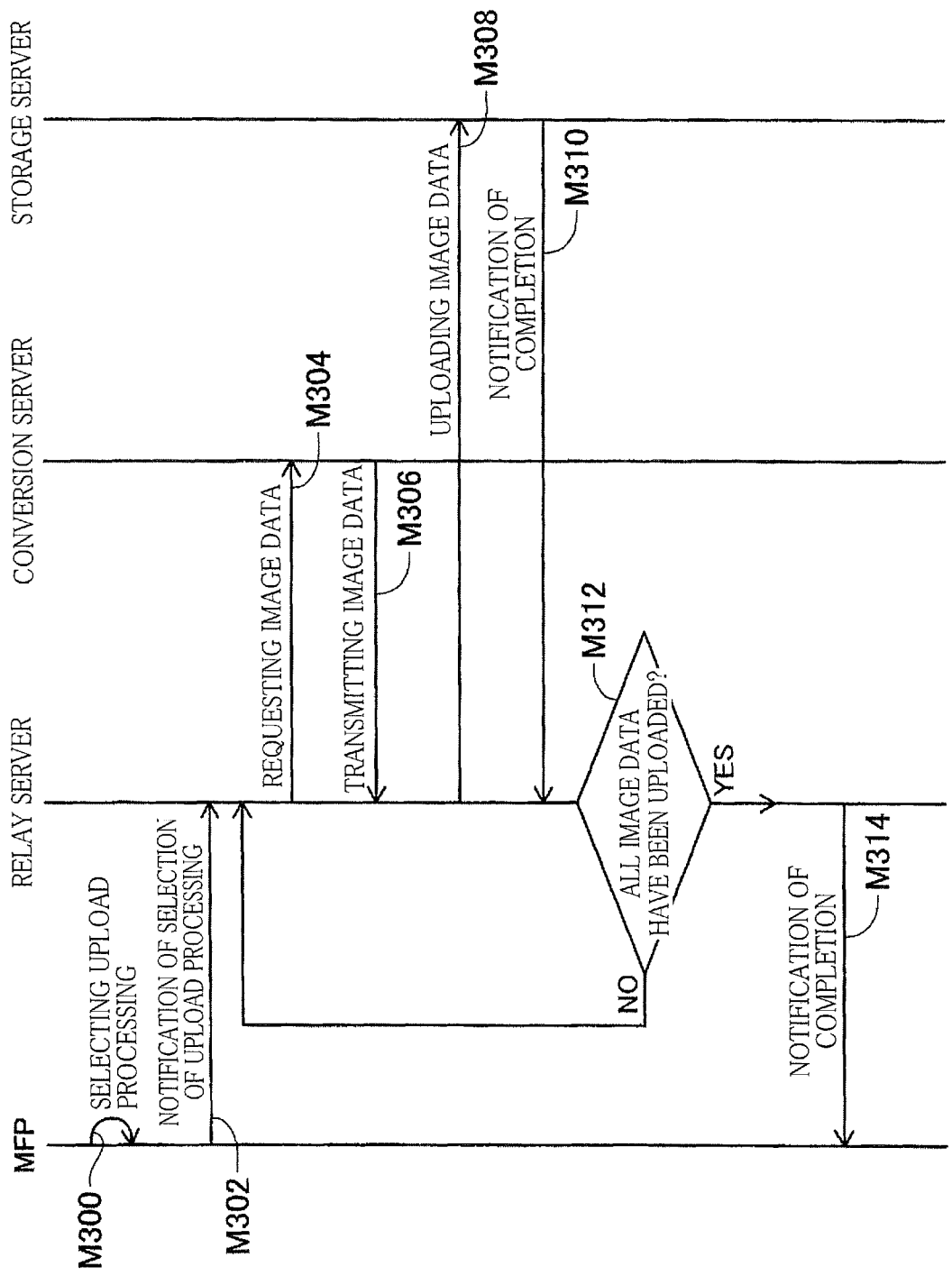
FIG. 11 is a sequence diagram illustrating operations of the communication system.
Figure 12:
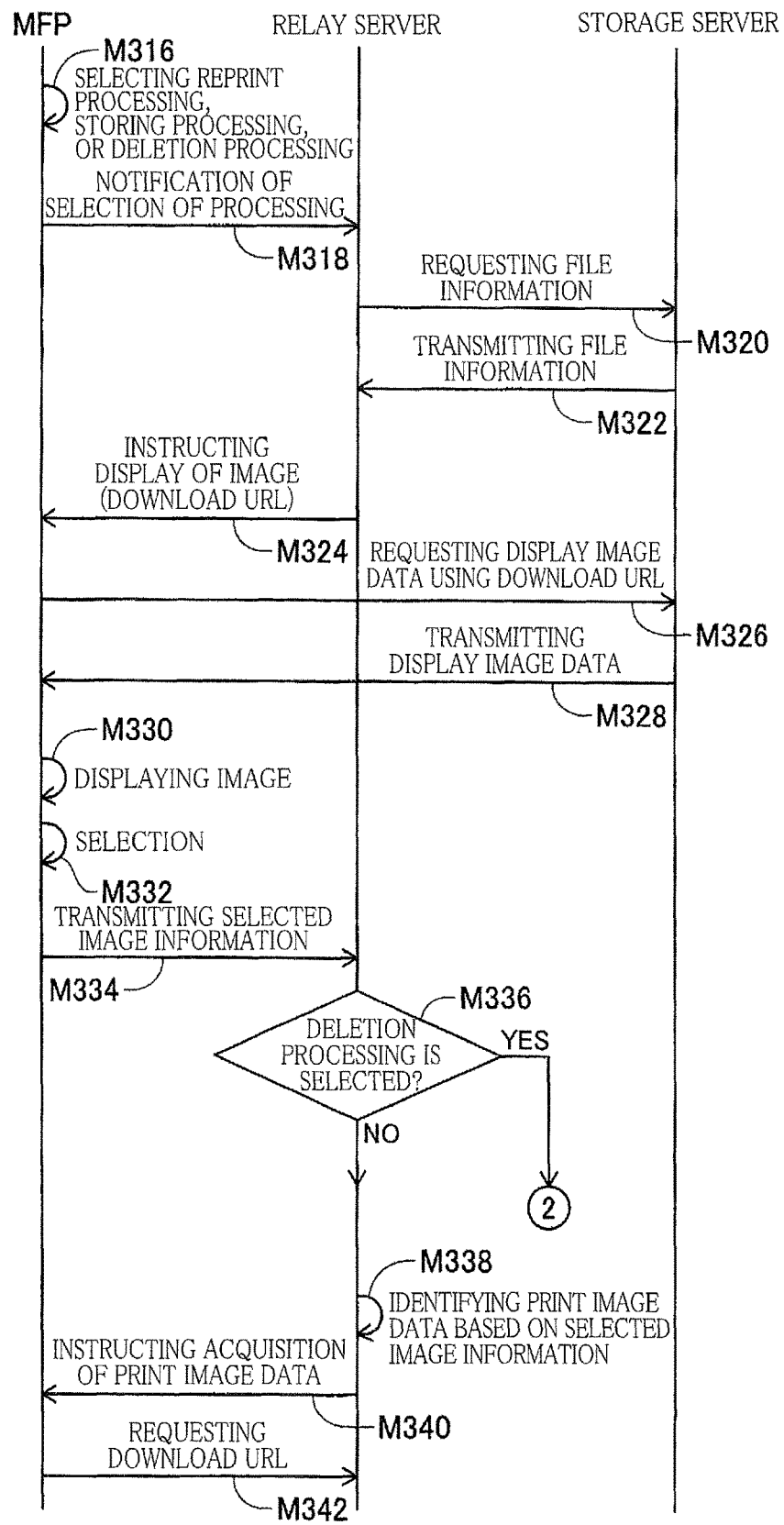
FIG. 12 is a sequence diagram illustrating operations of the communication system.
Figure 13:
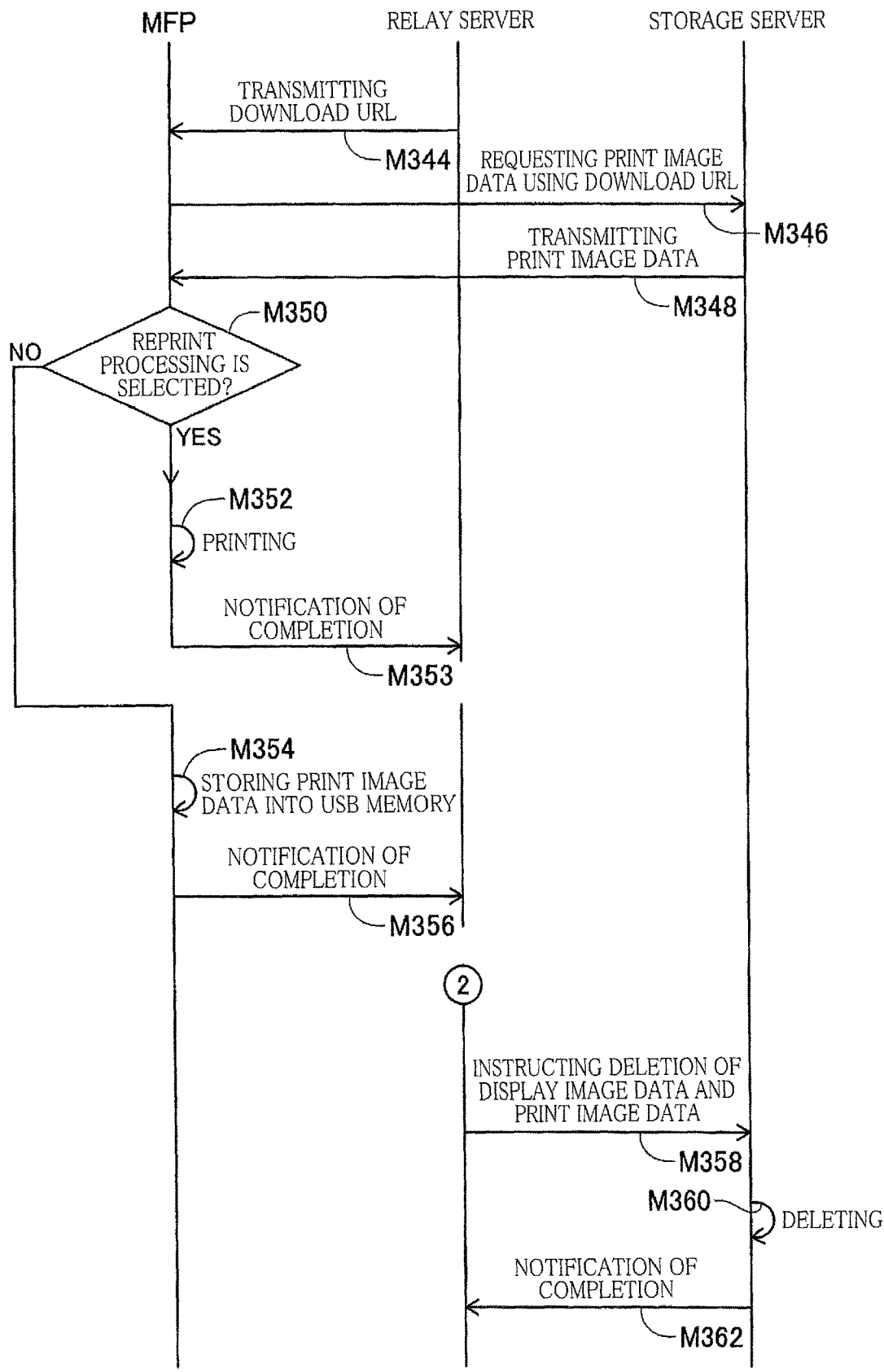
FIG. 13 is a sequence diagram illustrating operations of the communication system.

In the communication system 1 according to the first embodiment, the image data is uploaded to the storage server 62 and downloaded from the storage server 62 via the uploader/downloader 66. In the communication system 1 according to the second embodiment, the image data is uploaded to the storage server 62 and downloaded from the storage server 62 not via the uploader/downloader 66. There will be next explained, with reference to FIGS. 11-13, the upload processing for uploading the image data to the storage server 62 and the download processing for downloading the image data from the storage server 62 in the communication system 1 according to the second embodiment. It is noted that simple explanation will be provided for the same processings as explained with reference to FIGS. 4-10.

In the communication system 1 according to the second embodiment, when the button for uploading the image data created in the print processing to the storage server 62 is operated on the processing selection screen (M300), the MFP 30 at M302 transmits information indicating that the upload processing has been selected, to the relay server 10. Upon receiving the information, the relay server 10 at M304 requests the conversion server 60 to transmit the image data converted by the conversion server 60 to the relay server 10.

Upon receiving the request of the transmission, the conversion server 60 at M306 transmits the image data to the relay server 10. Upon receiving the image data, the relay server 10 at M308 uploads the image data to a particular folder in the storage server 62. The storage server 62 at M310 notifies the relay server 10 of completion of the upload. The relay server 10 at M312 determines whether all the image data converted by the conversion server 60 have been uploaded to the storage server 62 or not. When all the image data have not been uploaded to the storage server 62 (M312: NO), this flow returns to M304. When all the image data have been uploaded to the storage server 62 (M312: YES), the relay server 10 at M314 notifies the MFP 30 of completion of the upload. As a result, all the image data converted by the conversion server 60 are stored in the storage server 62.

When any of the button for selecting the reprint processing, the button for storing the image data created in the print processing into the USB memory 48, and the button for deleting the image data stored in the storage server 62 is operated on the processing selection screen (M316), information relating to the operated button is at M318 transmitted from the MFP 30 to the relay server 10. Upon receiving the information, the relay server 10 at M320 requests the storage server 62 to transmit file information relating to the MFP having transmitted the information relating to the operated button. That is, the relay server 10 sends the storage server 62 a request of transmission of the file information on the MFP 30.

Upon receiving the request of transmission of the file information, the storage server 62 at M322 transmits information on the folder name and the file name corresponding to the requested MFP, to the relay server 10 as the file information. Upon receiving the file information, the relay server 10 at M324 instructs the MFP 30 to display images. In this processing, the relay server 10 transmits, with the display instruction, a URL (as another example of the first identification information and the acquisition information) to be used for the MFP 30 to download corresponding display image data from the storage server 62. The MFP 30 at M326 uses the download URL to request the storage server 62 to download the display image data. In response to the request of the download, the storage server 62 at M328 transmits the display image data to the MFP 30. Processings at M330-M342 are identical to those at M226-M238 in FIGS. 8 and 9, and an explanation of which is dispensed with.

Upon receiving the request of transmission of the download URL, the relay server 10 at M344 sends the MFP 30 a URL for downloading the print image data identified at M338 from the storage server 62. The MFP 30 at M346 uses the download URL to request the storage server 62 to transmit the print image data to the MFP 30, that is, the MFP 30 transmits a download request to the storage server 62. In response to the request of the download, the storage server 62 at M348 transmits the print image data to the MFP 30. Processings at M350-M362 are identical to those at M260-M272 in FIG. 10, and an explanation of which is dispensed with.

In the communication system 1 according to the second embodiment as described above, the image data is directly transferred between the relay server 10 and the storage server 62 and between the MFP 30 and the storage server 62 without using the database 64 or the uploader/downloader 66. Accordingly, the configuration of the communication system 1 can be simplified.

It is noted that the processing at M308 is another example of the first transmission process. The processing at M322 is another example of the reception process. The processings at M324, M344 are another example of the second transmission process. The processing at M358 is another example of the third transmission process.

It is to be understood that the disclosure is not limited to the details of the illustrated embodiments, but may be embodied with various changes and modifications, which may occur to those skilled in the art, without departing from the spirit and scope of the disclosure. Specifically, while the relay server 10 acquires the file information from the storage server 62 and extracts the download information from the file information in the above-described embodiments, the relay server 10 may store the download information.

While the conversion server 60 creates the two types of image data based on the scan data indicating one image in the above-described embodiments, the conversion server 60 may create three or more types of image data, for example. For example, the conversion server 60 may, based on the scan data indicating one image, create display image data, print image data corresponding to an image having a size suitable for a sheet having the postcard size, and print image data corresponding to an image having a size suitable for a sheet having the A4 size. In such a case, these three types of image data is uploaded to the storage server 62, and one of the three types of image data is downloaded.

While the relay server 10 issues the temporary ID, and the database 64 stores the upload information 70*a* and the temporary ID issued by the relay server 10 in association with each other in the above-described embodiment, the database 64 may issue the temporary ID and store the temporary ID and the upload information 70*a* in association with each other. In such a case, the database 64 transmits the temporary ID to the relay server 10.

In the above-described embodiments, the CPU 12 executes the processings in FIGS. 2, 3, 5, and 7-13. These processings need not be executed by the CPU 12 and may be executed by an ASIC or another or other similar logical integrated circuits and may be executed by cooperation of the CPU, the ASIC, and the logical integrated circuit, for example.

What is claimed is:

1. A communication system comprising:
    a relay server comprising a communication device, a processor, and a memory;
    an image recording apparatus comprising a second communication device, a second processor, a second memory, a display for displaying an image in a display process, and a recorder for recording an image in a print process,
    an uploader comprising a third communication device, a third processor, and a third memory;
    a storage server comprising a fourth communication device, a fourth processor, and a fourth memory,
    wherein the second processor causes the image recording apparatus to perform, transmitting a first instruction to the relay server via the second communication device in a first transmission process, the first instruction being an instruction for uploading, to the storage server, display data and print data to be respectively processed in the display process and the print process for an image, a data size of the display data being less than a data size of the print data, wherein the processor causes the relay server to execute:
in response to receiving the first instruction for uploading the display data and the print data to the storage server from the image recording apparatus, generating uploading information comprising (a) information for identifying the image recording apparatus, (b) information for identifying the display data of the image from the image recording apparatus identified by the information identifying image recording apparatus, and (c) information for identifying the print data of the image from the image recording apparatus identified by the information identifying the image recording apparatus; and transmitting, to the uploader via the first communication device, a second instruction causing the uploader to upload the display data and the print data by using the generated uploading information to the storage server, wherein the third processor causes the uploader to execute transmitting a third instruction to the storage server, the third instruction causing the storage server to store, by using the generated uploading information, (a) the display data into the storage server in association with the information for identifying the image recording apparatus and the information for identifying the display data of the image, and (b) the print data into the storage server in association with the information for identifying the image recording apparatus and the information for identifying the print data, wherein the fourth processor causes the storage server to execute storing, by using the uploading information, (a) the display data into the storage server in association with the information for identifying the image recording apparatus and the information for identifying the display data of the image, and (b) the print data into the storage server in association with the information and the information for identifying the print data of the image, wherein the second processor causes the image forming apparatus to execute transmitting, to the relay server, a request of transmission of display data stored in the storage server and corresponding to the display process, and wherein the processor causes the relay server to execute, in response to receiving the request of transmission of the display data transmitting acquisition information to the image recording apparatus in a second transmission process, the acquisition information being for acquisition of display data for at least one image corresponding to the display process stored in the storage server.

2. The communication system according to claim 1, wherein the acquisition information is one of (i) the information for identifying the display data for the at least one image corresponding to the display process in the storage server and (ii) first identification information for identifying the information for identifying the display data.

3. The communication system according to claim 2, wherein the processor causes the relay server to execute:
receiving the information for identifying the display data from the storage server in a reception process; and transmitting one of the information for identifying the display data received in the reception process and the first identification information, as the acquisition information, to the image recording apparatus in the second transmission process.

4. The communication system according to claim 1,
wherein the first processor causes the relay server to, when the request of transmission of the display data is received from the image recording apparatus, transmit first acquisition information as the acquisition information, for acquisition of a plurality of display data from the storage server, to the image recording apparatus in the second transmission process, wherein the image recording apparatus is configured to use the first acquisition information transmitted in the second transmission process, to acquire the plurality of display data from the storage server and transmit, to the relay server, a request of transmission of print data indicating at least one image which is selected by a user operation from among a plurality of images displayed on the display based on the plurality of display data, and wherein the processor causes the relay server to, when the request of transmission of the print data indicating the at least one image is received from the image recording apparatus via the communication device, transmit second acquisition information, for acquisition of the print data indicating the at least one image from the storage server, to the image recording apparatus in a third transmission process.

5. The communication system according to claim 1,
wherein the processor causes the relay server to, when the request of transmission of the display data is received from the image recording apparatus, transmit the acquisition information, for acquisition of a plurality of display data from the storage server, to the image recording apparatus in the second transmission process, wherein the image recording apparatus is configured to use the acquisition information transmitted in the second transmission process, to acquire the plurality of display data from the storage server and transmit, to the relay server, a request of deletion of the display data and the print data corresponding to at least one image which is selected by a user operation from among a plurality of images displayed on the display based on the plurality of display data, and wherein the relay server is configured to, when the request of deletion of the display data and the print data corresponding to the at least one image is received from the image recording apparatus, transmit a request of deletion of the display data and the print data each corresponding to the at least one image, to the storage server in a fourth transmission process.

6. The communication system according to claim 1,
wherein the first communication device of the relay server is communicable with a database and the uploader,
wherein the processor causes the relay server to execute:
transmitting a fourth instruction to the database via the first communication device in a fourth transmission process, the second instruction being for storing (i) the information for identifying the display data into the database in association with first identification information and (ii) the information for identifying the print data of the image into the database in association with second identification information, the first identification information being for identifying the information for identifying the display data in the database, the second identification information being for identifying the information for identifying the print data of the image in the database; and wherein the uploader is configured to, in response to receiving the second instruction, the first identification information and the second identification information, acquire (i) the information for identifying the display data identified by the first identification information and (ii) the information for identifying the print data of the image identified by the second identification information from the database and upload the display data and the print data for which the second instruction is transmitted, to the storage server by using the first identification information and the second identification information.

7. The communication system according to claim 1,
wherein the first communication device of the relay server is communicable with a database and the downloader,
wherein the first processor causes the relay server to execute:
when the request of transmission of the display data is received from the image recording apparatus, transmitting a fourth instruction to the database in a fifth transmission process, the fourth instruction being for storing (i) the information for identifying the display data into the database in association with first identification information and (ii) the information for identifying the print data of the image into the database in association with second identification information, the first identification information being for identifying the information for identifying the display data in the database, the second identification information being for identifying the information for identifying the print data of the image in the database; and
transmitting the first identification information stored in the database according to the fourth instruction transmitted in the fifth transmission process, as the acquisition information to the image recording apparatus in the second transmission process,
wherein the image recording apparatus is configured to transmit the first identification information to the downloader in response to receiving the first identification information, and
wherein the downloader is configured to, in response to receiving the first identification information, acquire the information for identifying the display data stored in the database in association with the first identification information, download the display data from the storage server using the information for identifying the display data, and transmit the display data to the image recording apparatus.

8. The communication system according to claim 6, wherein the information for identifying the display data indicates a location of the display data in the storage server.

9. The communication system according to claim 1,
wherein the first processor causes the relay server to execute:
when the request of transmission of the display data is received from the image recording apparatus, determining in a determination process whether the display data is stored in the storage server;
when it is determined in the determination process that the display data is stored in the storage server, transmitting the acquisition information to the image recording apparatus in the second transmission process, the acquisition information being for acquisition of the display data from the storage server; and
when it is determined in the determination process that the display data is not stored in the storage server, transmitting the acquisition information to the image recording apparatus in the second transmission process, the acquisition information being for acquisition of preset data from the storage server, the preset data being different from the display data and set in advance in the storage server.

10. The communication system according to claim 1,
wherein the relay server is communicable with a conversion server configured to convert image data,
wherein the first processor causes the relay server to execute:
acquiring a request of conversion of the image data, from the image recording apparatus in a conversion-request acquisition process;
in response to acquiring the request of conversion in the conversion-request acquisition process, transmitting an instruction for conversion of the image data, to the conversion server in a sixth transmission process;
transmitting the second instruction for storing, into the storage server, the display data and the print data converted by the conversion server based on the instruction for conversion which is transmitted in the sixth transmission process.

11. The communication system according to claim 10,
wherein the image recording apparatus is configured to execute a reading process for reading an image recorded on a document and create image data, and
wherein-the relay server is configured to, in the conversion-request acquisition process, receive the instruction for conversion of the image data created by the image recording apparatus in the reading process.

12. The communication system according to claim 10, wherein the first processor causes the relay server to transmit location information to the image recording apparatus in a seventh transmission process, and the location information is information on a location, in the conversion server, of the display data and the print data converted by the conversion server based on the instruction for conversion which is transmitted in the sixth transmission process.

13. The communication system according to claim 1, wherein, the first processor causes the relay server to execute transmitting the second instruction, wherein the second instruction is an instruction for (a) storing the display data into the storage server and for conversion to the display data from the image data for the image, and (b) storing the print data into the storage server and for conversion to the print data from the image data for the image.

14. The communication system according to claim 1, wherein the fourth processor causes the storage server to store the information for identifying the display data, the information and the information associated with each other.

15. The communication system according to claim 1, wherein the request of transmission of the information does not include information for identifying a location of the display data for the image in the storage server.

* * * * *